Jan. 13, 1953          F. A. KROHM          2,624,903
WINDSHIELD WIPER ARM CONNECTOR
Filed May 26, 1948
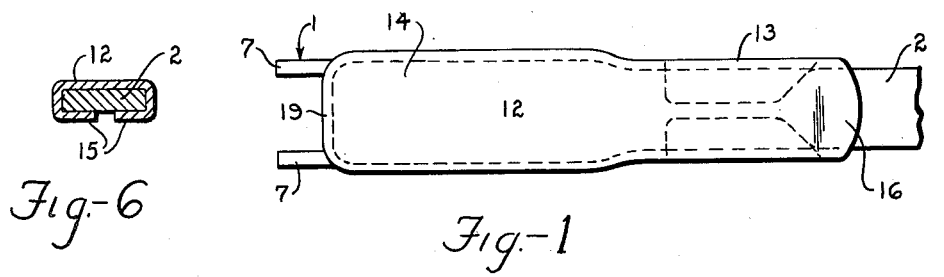
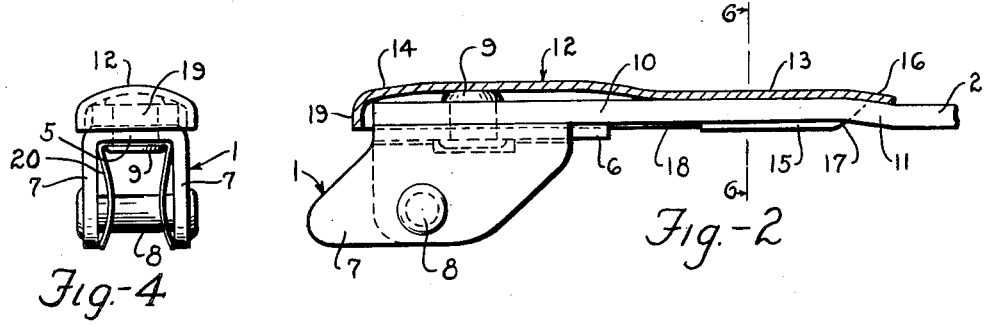
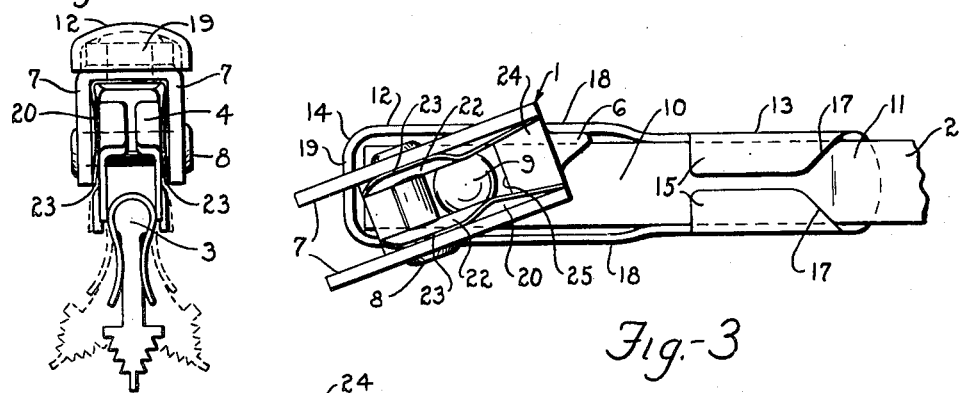
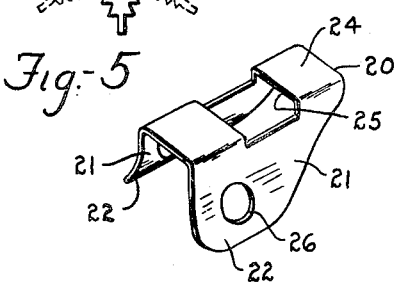
INVENTOR.
FRED A. KROHM
BY
Charles S. Penfold
ATTORNEY Patented Jan. 13, 1953

2,624,903

UNITED STATES PATENT OFFICE 2,624,903

WINDSHIELD WIPER ARM CONNECTOR

Fred A. Krohm, Gary, Ind., assignor to Productive Inventions, Inc., a corporation of Indiana Application May 26, 1948, Serial No. 29,302

10 Claims. (Cl. 15—250)

This invention relates generally to windshield wiper arms and more particularly to a means located adjacent the free end of an arm for detachably engaging a windshield wiper blade unit.

Automotive vehicles are being manufactured in which the windshield is comprised of two panes or sections arranged at angles to each other and at an angle with reference to the vertical. In such constructions, it is desirable that the windshield wiper blade be aligned with one of the edges of the windshield, preferably the lower edge, and in order to assist in this accomplishment, some wiper arms are provided with fixed angular offsets. Arms of this character, however, have disadvantages both as to manufacture and operation since it is necessary to provide right-hand and left-hand wiper arms for the two panes of the windshield. Such arms frequently have a tendency to become flexed or distorted to such an extent that they do not operate as intended.

Accordingly, one of the principal objects of the present invention is to provide an improved windshield wiper arm with a pivotal connector of such a character that a single model arm may be used for either pane or section of the windshield in order that the blade may be manually adjusted at the proper angle with respect to the arm to position the blade alongside the edge of the windshield frame.

One particular object of the invention is to provide a shroud member for substantially covering or concealing from view the means employed for fastening or securing the connector to its support in order to improve the general all around appearance of the assembly, and at the same time protect the fastening means from damage or injury particularly from the elements.

Another important object of the invention is to provide an arrangement whereby the connector is swively connected to the arm and the shroud or protecting member above referred to is connected to the arm at a point remote from the fastening means above referred to, such remote connection being constructed and arranged whereby to prevent longitudinal relative movement between such member and arm.

A still further object of the invention is to provide an improved connector and a resilient means associated therewith for the purpose of assisting to cushion any lateral pivotal or rocking movement which may occur between such connector and that part or portion of the wiper blade unit with which it is adapted to detachably engage.

Other objects and advantages of the invention reside in its simplicity, economy of manufacture, method of assembly, and efficiency in operation all of which will be better understood after considering the description hereinafter set forth in conjunction with the drawings annexed hereto.

Referring to the drawings, Figure 1 is a top plan view of an assembly embodying the invention;

Figure 2 is a side view in elevation of the assembly illustrated in Figure 1, with portions of the assembly in section;

Figure 3 is a bottom plan view of the assembly depicted in Figures 2 and 3;

Figure 4 is an end view of the assembly depicted in Figure 2;

Figure 5 is a view similar to Figure 4 showing the clip of a wiper blade received in the connector carried by the arm;

Figure 6 is a section taken substantially on line 6—6 of Figure 2; and

Figure 7 is a perspective view of a resilient element forming a part of the assembly.

In the drawing, numeral 1 designates a connector carried by a supporting arm 2, the connector being constructed for detachable engagement with a wiper blade 3 through a clip 4 carried by the blade.

The connector may be constructed as desired but is preferably made in the form of a channel having a base wall 5 provided with a projection or finger 6 and corresponding side walls 7 bridged by a fixed cylindrical cross pin 8 extending through holes provided therefor in such walls.

Fastening means 9, preferably in the form of a rivet, extends through the arm and base wall 5 of the connector for pivotally connecting the two together, the rivet being upset sufficiently to insure a good tight frictional fit between the substantially planar surfaces of such wall and arm so that the connector will be held in any desired pivotal position to which it may have been manually adjusted. The arm support 2 is preferably constructed of flat wire stock and provided with an end portion 10 offset with respect to the remainder of the arm by a junction or step 11. This end portion 10 carries the connector 1.

A shroud member or cover 12 preferably in the form of an elongated shallow housing is also carried by the end portion 10 and is arranged over the rivet 9. This cover member is generally rectangular and includes an inner extremity 13 and an outer extremity 14. The inner extremity 13 is of a width slightly less than that of the outer extremity 14 and is provided with fingers 15 which are clamped tightly against the under surface of the arm. An offset end continuation 16 is formed on the top wall of the member and bears against the outer surface of the arm. More specifically in this respect, longitudinal relative movement between the arm and member is prevented by having the continuation 16 and the marginal end edges 17 of the fingers 15 abut the upper and lower surfaces of the junction 11. The inner extremity 13 of the cover snugly receives the support 2 to provide a rigid connection therebetween. The outer extremity 14 of the cover also includes side walls 18 preferably spaced apart from the edges of the arm, and an end wall 19, the top wall being preferably raised or elevated to provide a space for the head of the rivet 9. With this arrangement the offset portion of the arm is substantially concealed from view as well as the rivet 9 thereby presenting an ornamental attractive cover which enhances the general all around appearance of the assembly, and harmonizes with the styling of the remainder of the arm structure.

Although not essential, the side walls 18 of the cover are preferably formed to project beyond the under surface of the arm to provide spaced stops or abutments which may be engaged by the finger 6 formed on the connector whereby to limit the range of pivotal movement of the connector relative to the arm.

The means employed for cushioning any lateral rocking or pivotal movement which may occur between the connector 1 and the clip 4 carried by and constituting a part of the wiper blade, comprises a resilient element 20 preferably of channel shape. The side walls 21 of this element are of a shape similar to that of the walls 7 of the connector and their extremities are preferably bent, flared, or bowed outwardly as indicated at 22. In other words, the side walls 21 are arranged in a diverging relationship and when the element is pressed into position substantially within the confines of the connector, it is placed under sufficient tension to cause the marginal edges 23 of the flares to intimately bear against the inner surfaces of the connector walls 7. The base wall 24 of the resilient element is provided with a clearance opening 25 for the offset end of the rivet 9 and its side walls 21 are provided with apertures 26 through which the cross pin 8 extends to hold the element in place, the diameter of the apertures 26 being somewhat greater than the diameter of the cross pin so as to allow the resilient bowed or flared portions of the side walls of the element to laterally adjust themselves or float with respect to the outer surfaces of the sides of the clip 4 when received therebetween, and at the same time permit the blade unit to pivot or rock about the longitudinal axis of the cross pin in order that the entire length of the wiping edges of the blade will engage the glass, irrespective of the angular relationship between the arm and the drive shaft to which it is connected. Since the element is placed under tension with portions interposed between the clip and the connector, considerable loose play will be taken up to prevent spanking of the clip against the side walls of the connector. As a consequence, a smooth acting and substantially noiseless connection is provided.

In addition to the foregoing, the resilient element serves to eliminate what is known in the trade as "galling" and "freezing" which ofttimes results when certain hard metal materials, such as stainless steel, are held in frictional contact over a considerable period of time, the connector and clip of the present construction being constructed of such material. The resilient element is so fashioned that the clip may be easily and quickly piloted into the connector and attached to the latter by locking means (not shown) which cooperates with the cross pin to hold the parts connected.

Modifications and changes in details will occur to those skilled in the art without departing from the spirit and scope of my invention, but having set forth the objects and nature thereof, and having shown and described constructions embodying the principles of my invention, what I claim as new and useful and of my own invention and desire to secure by Letters Patent is:

I claim:

1. A connector for connection with a wiper blade unit, an arm part, means extending through the connector and part for permanently and pivotally securing the connector to the part, and a shroud member clamped on the said part, said member being formed to cover said securing means and embrace a portion of the part.

2. A connector for detachable connection with a wiper blade unit, an arm part, means for pivotally securing the connector to the part, means overlying said securing means and attached to said part, said overlying means being provided with means disposed intermediate the point said overlying means is attached to said part and the point said connector is pivotally secured to said part for predetermining the pivotal movement of said connector.

3. A connector adapted for detachable connection with a wiper blade unit, an arm part, a connector, a rivet pivotally securing said connector to said part, a member attached to said part covering one extremity of the rivet, and stop means provided on said member at a point between said rivet and the point the member is attached to the part for limiting the pivotal movement of said connector.

4. A connector for detachable engagement with a wiper blade unit, an arm part, separate means for securing the connector to the part, a bent portion provided on said part, and a cover overlying said securing means carried by said part with portion cooperating with opposite sides of said bent portions to prevent longitudinal relative movement between said part and said cover.

5. A channel connector for detachable connection with a wiper blade unit, a support, a rivet passing through the base wall of said connector and through said support for connecting the two together, a resilient channel element disposed in said connector for cooperation with the blade unit, the base wall of said resilient element being provided with a clearance opening for one end of said rivet.

6. A channel connector adapted to engage a wiper blade unit, a support, a rivet passing through the base wall of said connector and through said support for connecting the two together, a resilient channel element disposed in said connector for cooperation with the blade unit, the base wall of said resilient element being provided with a clearance opening for one end of said rivet, and a member covering the other end of the said rivet.

7. A windshield wiper arm, a channel connector pivotally connected to said wiper arm, a resilient channel element disposed in said connector, said resilient element having a base wall and side walls, openings provided in the side walls of said resilient element, and means carried by said connector projecting into said openings for holding the connector and element assembled.

8. A channel connector for detachable connection with a wiper blade unit, a wiper arm part, means extending through the connector and part for pivotally securing the connector to the part, a shroud member clamped on the part, said member being formed to cover said securing means and embrace a portion of the part, and an inner channel element secured in the channel connector, said inner channel element having yieldable side walls for engaging a blade unit when the latter is disposed therebetween.

9. An outer channel connector for detachable connection with a wiper blade unit, a wiper arm part, means extending through the base wall of the channel connector and the part for securing the channel connector and part together, an inner channel element disposed in the outer channel connector, said inner channel element having a base wall and bowed resilient side walls, openings provided in said resilient side walls, an elongated cross-member extending through the openings and having its ends secured to the side walls of the outer channel connector for attaching the inner channel element in place so that its base wall will engage the base wall of the outer channel connector and the material of its side walls surrounding the openings will be spaced from the side walls of the outer channel connector in order to permit flexing of the resilient side walls in a direction corresponding to the longitudinal axis of the cross-member when a blade unit is operatively attached to the cross-member.

10. In combination: a windshield wiper arm part provided with an outer channel connector having a base wall and side walls, an inner channel element secured in the outer channel connector and having a base wall and side walls, each of the side walls of the inner channel element having a bowed portion, and each of said bowed portions having opposed marginal edges which bear against a side wall of the outer channel connector to position the material of the portion between the edges in spaced relation to said outer channel connector side wall so that when a wiper blade unit is operatively positioned in the outer channel connector the said portions may be caused to respectively yield toward the side walls of the outer channel connector.

FRED A. KROHM.

REFERENCES CITED

The following references are of record in the file of this patent:

UNITED STATES PATENTS

| Number | Name | Date |
|---|---|---|
| 1,017,078 | Buth | Feb. 13, 1912 |
| 1,070,676 | Frankhauser | Aug. 19, 1913 |
| 1,585,809 | White | May 25, 1926 |
| 1,742,596 | Hoff | Jan. 7, 1930 |
| 2,122,802 | Rappl | July 5, 1938 |
| 2,290,140 | Anderson | July 14, 1942 |
| 2,404,523 | Nesson | July 23, 1946 |
| 2,417,575 | Thomson | Mar. 18, 1947 |